US012640474B2

(12) United States Patent
Singh et al.

(10) Patent No.: US 12,640,474 B2
(45) Date of Patent: May 26, 2026

(54) GRATING LOBE-BASED METASURFACES WITH BEAM-SPLITTING CAPABILITY

(71) Applicant: Dell Products L.P., Round Rock, TX (US)

(72) Inventors: Tejinder Singh, Kanata (CA); Navjot Kaur Khaira, Kanata (CA); Morris Repeta, Ottawa (CA); Kan Wang, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 18/539,370

(22) Filed: Dec. 14, 2023

(65) Prior Publication Data

US 2025/0202112 A1 Jun. 19, 2025

(51) Int. Cl.
*H01Q 15/00* (2006.01)
*H01Q 3/46* (2006.01)

(52) U.S. Cl.
CPC .................................... *H01Q 3/46* (2013.01)

(58) Field of Classification Search
CPC ........................ H04B 7/04013; H01Q 15/0086
See application file for complete search history.

(56) References Cited

U.S. PATENT DOCUMENTS 7,319,429 B2 1/2008 Chang et al.
9,515,390 B1 * 12/2016 Feng .................... H01Q 15/148
11,133,588 B1 * 9/2021 Matos ...................... H01Q 3/46
11,575,214 B2 2/2023 Hand et al.
2014/0211298 A1 * 7/2014 Sayyah ................. G01S 7/4817 438/69
2021/0367341 A1 * 11/2021 Hasan Abadi ....... H01Q 21/065
2024/0204414 A1 * 6/2024 Lemesh ............. H01Q 15/0013
2025/0174903 A1 * 5/2025 Miyazaki ............... H01Q 15/08

FOREIGN PATENT DOCUMENTS

CN 108767493 11/2018
CN 110011058 7/2019
CN 106505316 B 6/2021
(Continued)

OTHER PUBLICATIONS

Notice of Allowance mailed Jun. 24, 2025 for U.S. Appl. No. 18/403,467, 39 pages.
(Continued)

*Primary Examiner* — Awat M Salih
(74) *Attorney, Agent, or Firm* — Amin, Turocy & Watson, LLP

(57) ABSTRACT

The technology described herein is directed towards designing and implementing multibeam metasurfaces, based on deriving the directions of grating lobes within a general rectangular grid structure. The derivation is used to design and implement multibeam metasurfaces. A multibeam metasurface is designed based on the directions of the grating lobes and desired beam splitting angles, which are used to determine unit cell/element grid characteristics of periodicity data and orientation. When deployed, the multibeam metasurface splits an impinging electromagnetic wave/beam in the desired multiple beam splitting directions. In one implementation, the multibeam metasurface is implemented in a single surface.

20 Claims, 11 Drawing Sheets

(56) References Cited

FOREIGN PATENT DOCUMENTS

| | | |
|---|---|---|
| CN | 114883808 | 8/2022 |
| EP | 4395075 | 7/2024 |
| JP | 7371819 | 10/2023 |
| WO | 2022/229767 | 11/2022 |

OTHER PUBLICATIONS

Yu, et al., "Experimental demonstration of a single layer tri-band circularly polarized reflectarray," 2010 IEEE Antennas and Propagation Society International Symposium, Toronto, ON, Canada, 2010, pp. 1-4, doi: 10.1109/APS.2010.5562303.

International Search Report and Written Opinion for PCT Application No. PCT/US2024/013713 mailed Oct. 9, 2024, 15 pages.

International Search Report and Written Opinion for PCT Application No. PCT/US2024/013733 mailed Sep. 13, 2024, 14 pages.

Basari, et al., "Field Measurement on Simple Vehicle-Mounted Antenna System Using a Geostationary Satellite," in IEEE Transactions on Vehicular Technology, vol. 59, No. 9, pp. 4248-4255, Nov. 2010, doi: 10.1109/TVT.2010.2066997.

Zhu, et al., "Dual-Band Dual Circularly Polarized Antenna Array Using FSS-Integrated Polarization Rotation AMC Ground for Vehicle Satellite Communications," in IEEE Transactions on Vehicular Technology, vol. 68, No. 11, p. 10742-10751, Nov. 2019, doi: 10.1109/TVT.2019.2938266.

Baladi, et al. "Dual-Band Circularly Polarized Fully Reconfigurable Reflectarray Antenna for Satellite Applications in the Ku-Band," in IEEE Transactions on Antennas and Propagation, vol. 69, No. 12, pp. 8387-8396, Dec. 2021, doi: 10.1109/TAP.2021.3090577.

Li, et al., "A Dual-Passband Frequency Selective Surface for 5G Communication," in IEEE Antennas and Wireless Propagation Letters, vol. 18, No. 12, pp. 2597-2601, Dec. 2019, doi: 10.1109/LAWP.2019.2944936.

Jilani, et al., "Millimeter-Wave Liquid Crystal Polymer Based Conformal Antenna Array for 5G Applications," in IEEE Antennas and Wireless Propagation Letters, vol. 18, No. 1, pp. 84-88, Jan. 2019, doi: 10.1109/LAWP.2018.2881303.

Jilani, et al., "A Multiband Millimeter-Wave 2-D Array Based on Enhanced Franklin Antenna for 5G Wireless Systems," in IEEE Antennas and Wireless Propagation Letters, vol. 16, pp. 2983-2986, 2017, doi: 10.1109/LAWP.2017.2756560.

Ahmed Foez et al: "Highly Transparent Fully Metallic 1-Bit Coding Metasurfaces for Near-Field Transformation", 2022 16th EUCAP, European Association for Antennas and Propagation, Mar. 27, 2022 (Mar. 27, 2022), pp. 1-4.

Diaz-Rubio A et al: "Macroscopic Modeling of Anomalously Reflecting Metasurfaces: Angular Response and Far-Field Scattering", arxiv.org, Cornell University Library, Mar. 9, 2021 {Mar. 9, 2021}, 13 pages.

Singh et al. "Multiband Reflective Surface With Beam Steering and Beam Splitting Functionality" U.S. Appl. No. 18/403,467, filed Jan. 3, 2024, 35 pages.

Quevedo-Teruel, et al., "Roadmap on metasurfaces," Journal of Optics, vol. 21, No. 7, pp. 073002, Jul. 2019.

Basharat, et al., "Reconfigurable Intelligent Surfaces: Potentials, Applications, and Challenges for 6G Wireless Networks," in IEEE Wireless Commun., vol. 28, No. 6, pp. 184-191, Dec. 2021, doi: 10.1109/MWC.011.2100016.

Chen, et al., "Reconfigurable Intelligent Surfaces for 6G IoT Wireless Positioning: A Contemporary Survey," IEEE Internet of Things J., vol. 9, No. 23, pp. 23570-23582, 1 Dec. 1, 2022, doi: 10.1109/JIOT.2022.3203890.

Bhattacharyya, "Phased Array Antennas Floquet Analysis, Synthesis, BFNs, and Active Array System," Hoboken: Wiley-IEEE Press, 2020.

Huang, et al., "Reflectarray Antennas, by Institute of Electrical and Electronics Engineers," John Wiley & Sons, Ltd, 2008.

Balling, et al., "Multiple contoured beam reflector antenna systems," IEEE Antennas and Propagation Society International Symposium, Michigan, USA, Jun. 28-Jul. 2, 1993.

Schulwitz, et al., "A compact dual-polarized multibeam phasedarray architecture for millimeter-wave radar," IEEE Trans. Microw. Theory Tech., vol. 53, No. 11, pp. 3588-3594, Nov. 2005.

Lanteri, et al., "Four-beam reflectarray antenna for mm-waves: design and tests in far-field and near-field ranges," EuCAP 2009, Berlin, Germany, pp. 2532-2535, Mar. 2009.

Nayeri, "Advanced Design Methodologies and Novel Applications of Reflectarray Antennas," Ph.D. dissertation, Dept. Eng. Sci., Univ. of Mississippi, Jul. 2012.

Nayeri, et al., "Single-feed multi-beam reflectarray antennas," IEEE Antennas and Propagation Society International Symposium, Toronto, Canada, Jul. 2010.

Nayeri, et al., "Reflectarray Antennas: Theory, Designs and Applications," Hoboken: Wiley-IEEE Press, 2018.

* cited by examiner

GRATING LOBE-BASED METASURFACES WITH BEAM-SPLITTING CAPABILITY

BACKGROUND

Designing and implementing multibeam metasurface structures poses several complex challenges. Existing approaches for multibeam metasurfaces include feed-horn clusters, using reflectors to redirect electromagnetic waves towards clusters of feed horns that generate beams in specific directions; however, achieving multibeam capabilities often necessitates complex feed-horn arrangements, leading to increased design complexity and higher manufacturing costs.

Another approach is to use large-phased arrays that employ an array of radiating elements, each driven by an independent phase shifter to control the phase of each element and thereby steer beams in different directions. Although providing versatile beam control, the size, weight, and biasing complexity of such arrays make it very challenging to implement in compact devices, while incurring high costs due to the required number of phase shifters and radiating elements. Another, geometrical design approach simply divides a surface into multiple sub-arrays, with each sub-array designed to radiate at different directions; however, this approach suffers from high side-lobe due to amplitude taper, beam broadening and gain loss resulting from the multiple sub-array division.

A superposition design method uses the superposition of an aperture field on each element associated with each beam on the aperture. A significant problem of this approach results from the unit cells not having individual control of both amplitude and phase. As a result, during the synthesis of a surface of the unit cells, the assumption with respect to the amplitude is not true, and thereby results in degraded performance, particularly high side lobe and gain loss due to the side lobe.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards designing and implementing a metasurface that splits an impinging electromagnetic wave/beam in desired multiple beam splitting angles; as such the metasurface is referred to herein as a multibeam metasurface. In one implementation, (in contrast to needing multiple layers of surfaces), a single surface acts as the multibeam metasurface, providing benefits including lower cost, being more compact, being more efficient, and so on.

As described herein, grating lobes (which are typically avoided) are used to facilitate the beam splitting in the desired far-field direction or directions. As will be understood, polar angle data θ and azimuth angle data ϕ are derived to locate the far-field directions of higher order propagation modes. Once the angle data/mode directions are known, the directions can be used to implement a multibeam metasurface for specified beam splitting angles; (the fundamental mode can be used for one beam direction of the desired beam splitting directions).

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

Figure 1:
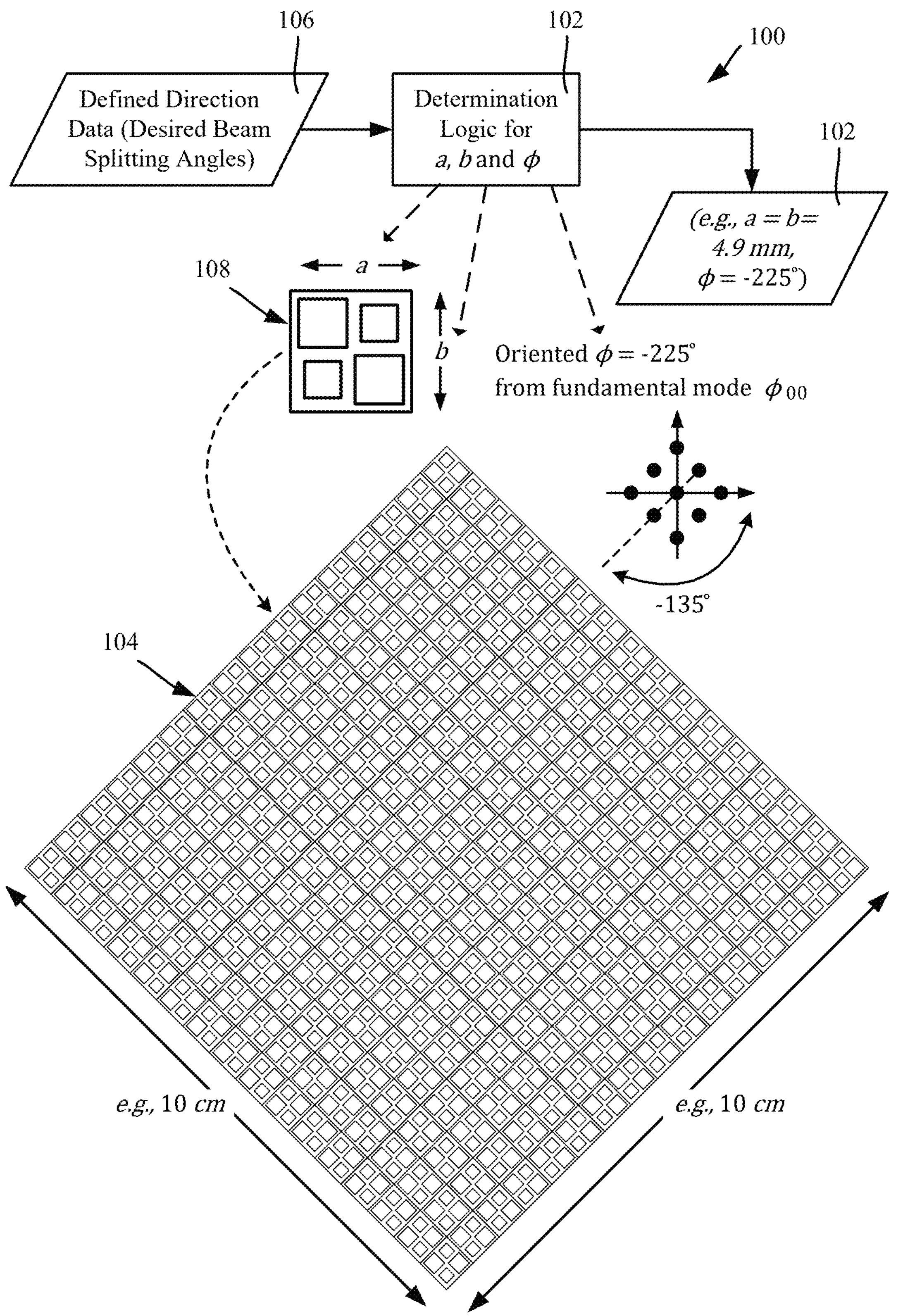
FIG. 1 is a block diagram showing an example system for determining parameters for a multibeam metasurface, in accordance with various aspects and implementations of the subject disclosure.

FIG. 1 shows a generalized block diagram of an example system 100 including determination logic 102 for implementing a reflective (or refractive) surface 104 (a multibeam metasurface) that splits a received electromagnetic wave into radiated redirected beams at beam splitting angles according to defined direction data (desired beam splitting angles) 106. As described herein, the determination logic 102 operates to determine periodicity data (a, b) of a grid of radiating elements that are part of the surface 104; (one enlarged example radiating element 108 is shown in more detail; the sizes of the rectangles (squares in this example) are designed for electromagnetic wave specified frequencies, e.g., the larger rectangles are for 28 GHz, the smaller rectangles are for 40 GHz). Note that the square shape is only one arbitrary, nonlimiting example, as any shape can be used as long as the shape is resonant at the desired/design frequency. It should also be noted that the numbers of radiating elements (unit cells) and their sizes relative to the surface (which also can be of different dimensions) are not intended to be representative of actual numbers and sizes, and are only depicted for purposes of explanation. As also described herein, the determination logic 102 also operates to determine the value of an azimuth (rotation) angle $\phi$ to which the surface elements are oriented.

As will be understood, the a and b values of the periodicity data (in this example a=b) and the azimuth angle $\phi$ are optimized by the determination logic 102 to result in the impinging electromagnetic wave being split to the defined/specified angular directions. In one general example described herein, three defined angles to which the impinging electromagnetic wave is split are −60°, 40° and −5° results in the periodicity data determined as a=b=4.9 mm and azimuth angle $\phi$ for the surface (plane of interest $\phi_{00}$) is −225°.

Figure 2:
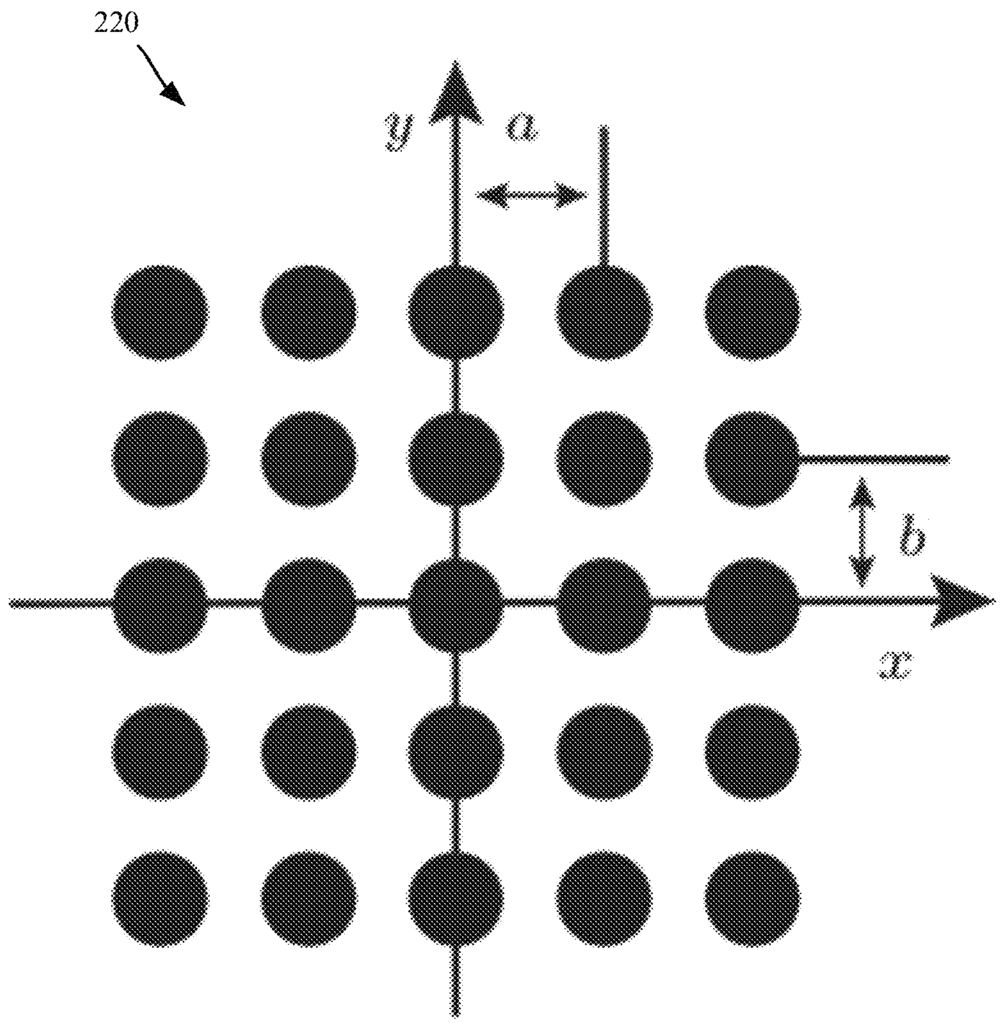
FIG. 2 is an example representation of a grid structure corresponding to a general rectangular grid for unit cell layout, in accordance with various aspects and implementations of the subject disclosure.
Figure 3:
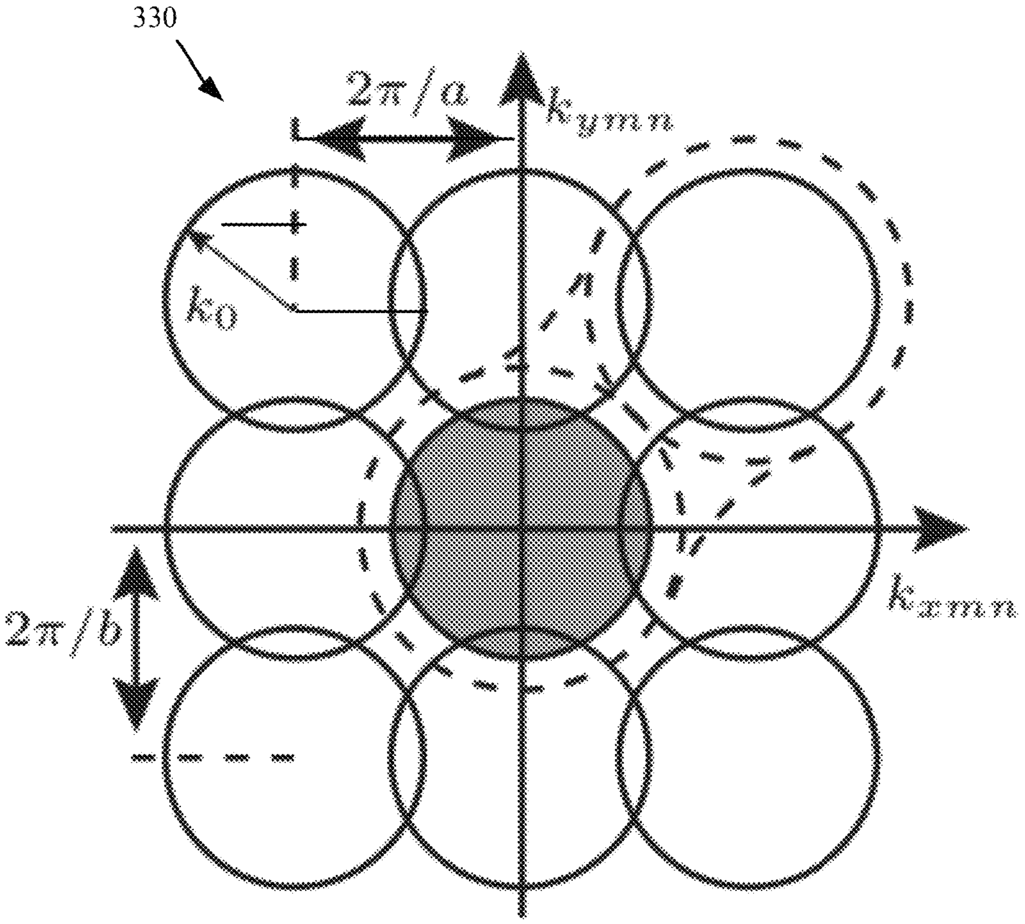
FIG. 3 is an example representation of a circle diagram for evaluating geometry related to radiation propagation of propagation modes of interest, in accordance with various aspects and implementations of the subject disclosure.
Figure 4:
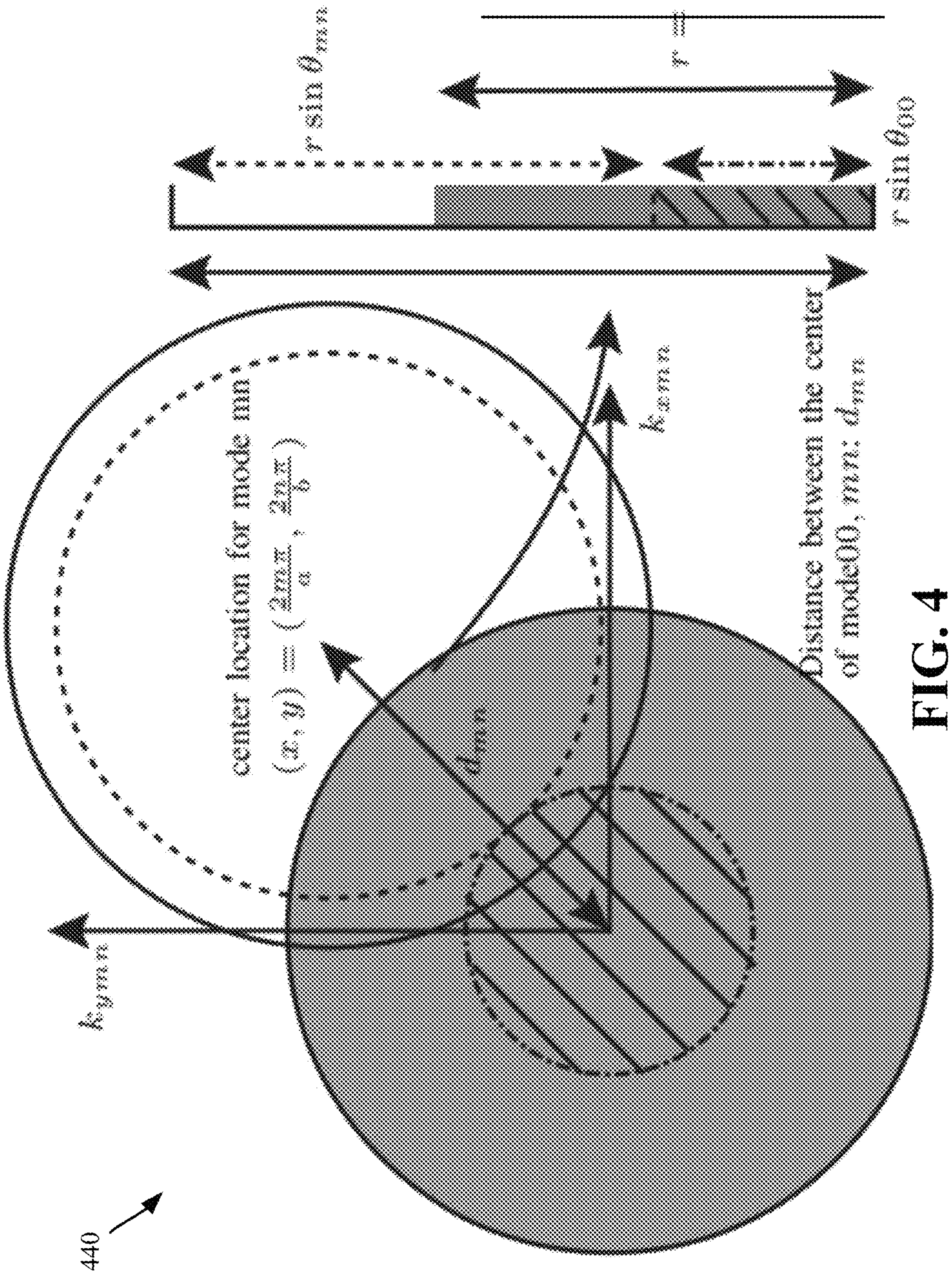
FIG. 4 is an example zoomed-in representation of part of the circle diagram of FIG. 3 with a fundamental mode and a mode of interest for determining a far-field radiation angle θ, in accordance with various aspects and implementations of the subject disclosure.

Described herein with reference to FIGS. 2-4 is a technology including a procedure for designing and implementing a multibeam metasurface, particularly through the manipulation of the grid characteristics to fine-tune the direction of each beam generated by the surface. The determination logic 102 is based on equations that ascertain the far-field direction based on the grid attributes. The design methodology is shown with respect to a design example that is substantiated through both numerical simulations and experimental validation.

A first part of the technology described herein is directed to deriving grating lobe locations in a rectangular grid structure using Floquet analysis. To this end, FIG. 2 depicts a general rectangular grid 220 for unit cell layout, and FIG. 3 depicts a circle diagram 330 representing condition of propagation for any mode of interest. FIG. 4 is a zoomed-in view 440 of the circle diagram with the fundamental mode and a mode of interest (horizontally and vertically adjacent and partially overlapping) for determining the far-field radiation angle θ.

The circle diagram in Floquet analysis can be used to derive the grating lobe directions for the higher order propagation modes. After the derivation the analysis can be used in the design for a multibeam metasurface. The Floquet series of the surface current on the general grid structure with a two-dimensional Floquet excitation and some basic properties is represented in Equation (1):

$$\vec{I}(x, y) = \hat{y}\frac{4\pi^2}{ab}\sum_m\sum_n \tilde{f}(k_{xmn}, k_{ymn})\exp(-jk_{xmn}x - jk_{ymn}y) \tag{1}$$

$$k_{xmn} = k_{x0} + \frac{2m\pi}{a} \quad k_{ymn} = k_{y0} + \frac{2n\pi}{b} - \frac{2m\pi}{a\tan\gamma} \tag{2}$$

where x, y, a, b, γ can be indicated by the illustration of the general grid structure in FIG. 1 (the grid angle γ is set to 90°). Two constants $k_{xmn}$ and $k_{ymn}$ determine the phase shift between the adjacent cells. In the derivation of the rectangular grid structure, the grid angle γ is set to 90° and $x_{mn}$=ma, $y_{mn}$=nb. The (m, n) terms are associated with T $M_{ymn}$ Floquet mode, where (0, 0) Floquet mode is considered as the dominant mode.

The corresponding radiation angles in the spherical coordinate system are defined by:

$$k_{xmn} = k_0\sin\theta_{mn}\cos\phi_{mn} \tag{3}$$

$$k_{ymn} = k_0\sin\theta_{mn}\sin\phi_{mn} \tag{4}$$

$$k_{zmn} = k_0\cos\phi_{mn} \tag{5}$$

A Floquet mode becomes a propagation plane wave only if the following condition is satisfied:

$$k_{xmn}^2 + k_{ymn}^2 \le k_0^2 \tag{6}$$

Combining the above equations using γ=90° gives a family of circular regions as shown in FIG. 3:

$$\left(k_{xmn} - \frac{2m\pi}{a}\right)^2 + \left(k_{ymn} - \frac{2n\pi}{b}\right)^2 = k_0^2\sin\theta_0^2 \tag{7}$$

Ordinarily designers want to avoid grating lobes; described herein is designing the surface grid parameters (a, b, $\phi_{00}$) such that the grating lobes result in the desired beam splitting. With respect to classic half-wavelength spacing derived using the circle diagram, for explanatory purposes described herein is first avoiding grating lobe using the circle diagram. The circle diagrams in FIG. 3 correspond to the geometric representation of Equation (7). The darker circle in the center with a radii of $k_0$ corresponds to the condition of propagation modes. The dashed circle in FIG. 4 represents the specific mode with specific angle of propagation with radii of r sin $\theta_{mn}$. If the dashed circle intersects the darker circle in the middle, this means Equation (6) is satisfied and the mode with such angle will be propagation into the far field.

To avoid grating lobes, only the fundamental mode should overlap with the darker area while keeping all the other modes out of the region. The closest mode circles are mode (m, n)=(1, 0), (0, 1), (−1, 0), (0, −1). This can be seen from the distance between the adjacent centers dmn=r sin $\theta_{00}$+r sin $\theta_{mn}$ shown in the right of FIG. 4. The total distance center to center of the closest mode $$d_{mn} = d_{(1,0),(0,1),(-1,0),(0,-1)} = \frac{2\pi}{a}$$

assuming grid period a=b. For complete mitigation of the grating lobe, $\theta_{mn}$ is set to its maximum 90° to ensure the higher order mode does not propagate in any given angle, resulting in r sin $\theta_{mn}$=$k_0$. Substituting the expression for the above three terms yields:

$$k_0 \sin\theta_{max} = \frac{2\pi}{a} - k_0 \tag{8}$$

Substituting using $k_0=2\pi/\lambda_0$ gives:

$$a = \frac{\lambda_0}{1 + \sin\theta_{max}} \tag{9}$$

With θ=90 degrees as the maximum main beam angle, the classic half-wavelength spacing is obtained as a=b=λ/2.

Turning to using grating lobes as described herein, grating lobe locations are derived using circle diagram. More particularly, described is driving the location of a grating lobe in a rectangular grid using the circle diagram. This can be divided into two steps; a first step derives the relationship between grid geometry a, b and $\theta_{mn}$, and a second step derives the relationship between the geometry and $\theta_{mn}$.

The expression of $\theta_{mn}$ (the polar angle for a mode (m, n) can be found from the geometric relationship of the circles of the fundamental mode and the mode of interest. Specifically, the radius of the dashed circle is the interested r sin $\theta_{mn}$, analogous to radius of the dot-dashed circle of the fundamental mode r sin $\theta_{00}$ as given in Equation (7). To solve for the radius of the dashed circle, the line crossing the two circle centers can be used.

The total line distance, or the distance between the circle center of any mode in Equation (7) to the center of the propagation circle is:

$$d_{mn} = \sqrt{\frac{2m\pi^2}{a} + \frac{2n\pi^2}{b}} \tag{10}$$

With the radius of the dot-dashed circle of r sin $\theta_{00}$, the radius of the solid circle r=$k_0$ from Equation (6), and the relationship of the line crossing the two circles $d_{mn}$r sin $\theta_{mn}$+r sin $\theta_{00}$, the expression of $\theta_{mn}$ is given:

$$\theta_{mn} = \arcsin\frac{\sqrt{\frac{2m\pi^2}{a} + \frac{2n\pi^2}{b}} - k_0\sin\theta_{00}}{k_0} \tag{11}$$

Combining Equation (2), Equation (3) and Equation (11), the following relationship can be used to solve for $\phi_{mn}$:

$$\cos\phi_{mn} = \frac{k_{x0} + \frac{2m\pi}{a}}{k_0\sin\theta_{mn}} \quad \sin\phi_{mn} = \frac{k_{y0} + \frac{2n\pi}{b}}{k_0\sin\theta_{mn}} \tag{12}$$

After knowing the trigonometric identities, one way to calculate the angle is (with the result ranging from −180 degrees to 180 degrees):

$$\phi_{mn} = \frac{\sin\phi_{mn}}{|\sin\phi_{mn}|}\cos\phi_{mn} \tag{13}$$

Thus, the expression of the radiation direction for the propagation Floquet modes are derived using the circle diagram. The expression relates the far-field radiation angle of the Floquet modes to the grid periodicity a, b and beam-steering direction of the fundamental mode $\theta_{00}$, $\phi_{00}$ from term $\theta_{00}$, $k_{x0}$, $k_{y0}$ by Equation (3).

Turning to designing a multibeam metasurface based on grating lobe direction analysis, the grid property of the metasurface with beam-splitting to 3 directions is designed. The specific directions in one plane are chosen arbitrarily being −60°, 40° and −5° in an arbitrary plane of φ. The required periodicity to satisfy the requirement at 40 GHz is a=b=4.9 mm, and the plane of interest is $\phi_{00}$=−135°. Using Equation (11) and Equation (12), the propagation modes and their directions are calculated as:

| Propagation Mode (mn) | Theta (°) | Phi (°) |
|---|---|---|
| 00 | 60 | −135 |
| 01 | 12.49 | −52.49 |
| 10 | 12.49 | 142.5 |
| 11 | 41.65 | 45 |

where the three beams are firstly mode 00, secondly mode 01 and 10 combined with a small value of θ, and lastly mode 11.

To this end, the defined direction of interest 106 (FIG. 1) for the multibeam metasurface is thus −60°, 40° and −5°. Based on a selected angle (e.g., the largest incident angle $\theta_{00}$ from the z-axis, or 60° in this example), the determination logic 102 operates to optimize the grid period (a, b) and orientation $\phi_{00}$ such that each higher order mode radiates at the defined direction. The expression of the direction for any arbitrary mode are given via Equations (11) and (13). Note that many suitable optimization algorithms can be used, e.g., to find the best solution from among a set of possible solutions to a given problem; in this context, optimization involves finding the values for periodicity and rotation angle that maximize radiation in the specified directions, subject to a set of constraints, such as periodicity being greater than the half-wavelength for grating lobe generation, and smaller than a frequency-specific value such that only selected higher order modes are radiating.

Once the values for periodicity and rotation angle are determined, a surface can be implemented using the optimized grid period and orientation, e.g., synthesized to validate the result. Note that while beam splitting in three directions is described in the example above, beam-splitting capability in two directions is straightforward, using the same described methodology, and is flexible if one of the directions is within approximately 10° of the direction perpendicular to the surface, which can be demonstrated using measured results. Four direction beam-splitting is also possible, but limited to the extent that two of the directions need to be symmetric, for example azimuth angle being −10° and +10° degrees (as one is positive and the other is negative with the exact value); this is because the circle diagram is symmetric.

Figure 5:
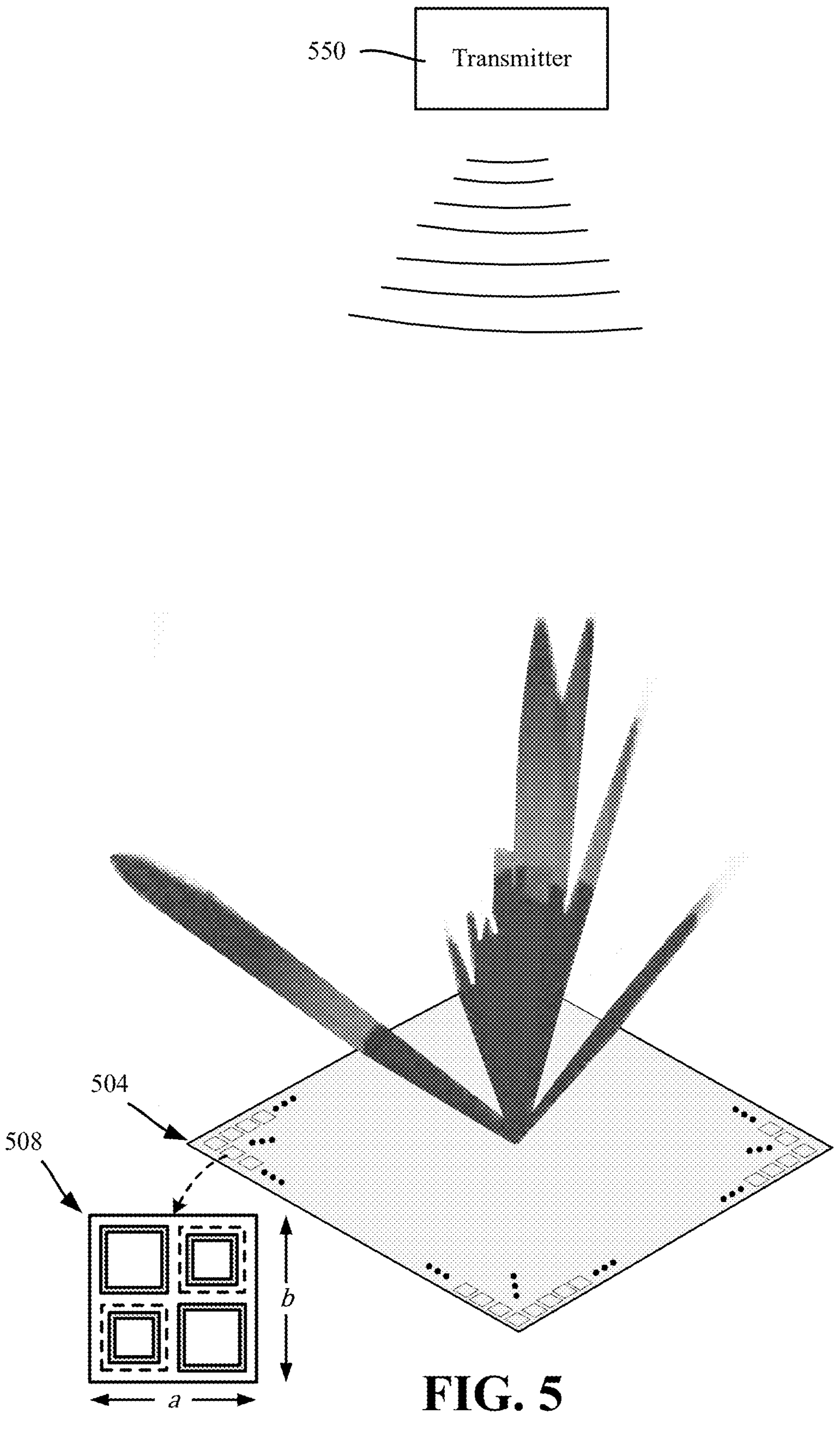
FIG. 5 is an example representation of beam splitting by a multibeam metasurface designed and implemented based on the technology described herein, in accordance with various aspects and implementations of the subject disclosure.
Figure 6A:
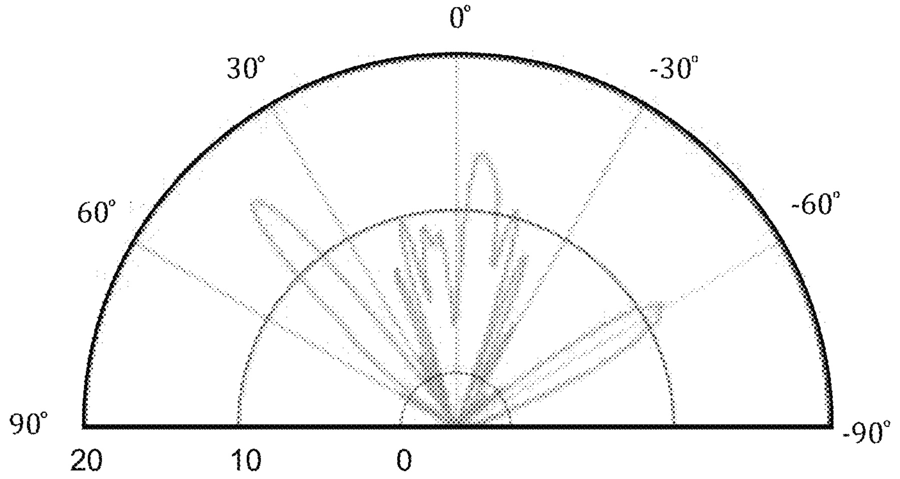
FIG. 6A is representation of an example polar plot of measured gain of a synthesized multibeam metasurface corresponding to FIG. 5, in accordance with various aspects and implementations of the subject disclosure.
Figure 6B:
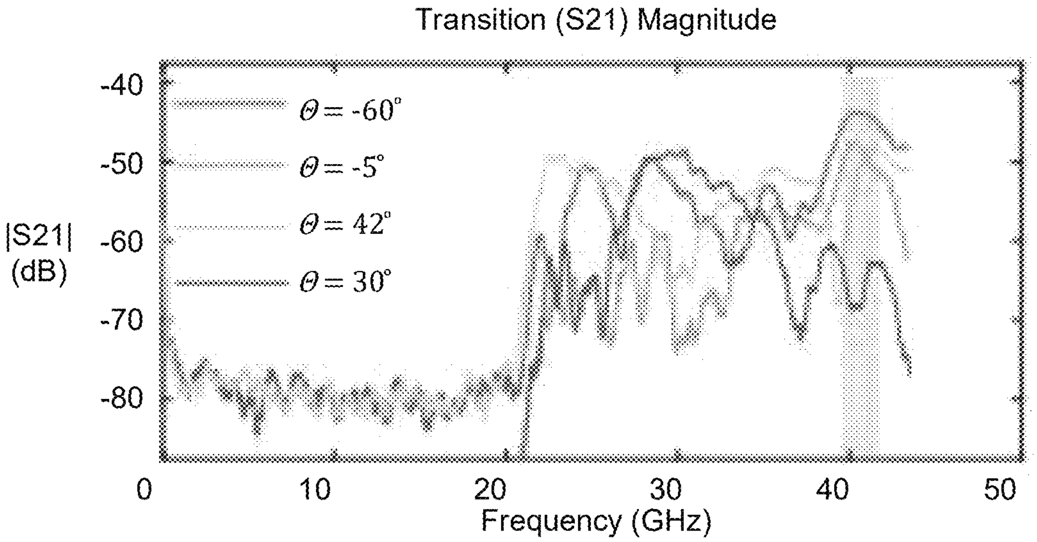
FIG. 6B is representation of an example measured spectrum response at various beam splitting angles versus varying frequency in a structure corresponding to the multibeam metasurface of FIG. 5, in accordance with various aspects and implementations of the subject disclosure.

FIGS. 5, 6A and 6B represent numerical and experimental results with respect to the multibeam metasurface 504 with beam-splitting in the three specified directions of −60°, 40° and −5°. The multibeam metasurface 504 is flat relative to the impinging wave from the transmitter 550 location.

One enlarged unit cell 508 of the dual-band unit cells (e.g., of 28 GHz and 40 GHz) distributed over the surface (only some of which are depicted) is used in this example as shown in FIGS. 1 and 5. As with FIG. 1 and any of the figures including FIG. 5, it should be noted that the numbers of radiating elements (unit cells) and their sizes relative to the surface (which also can be of different dimensions) are not intended to be representative of actual numbers and sizes, and are only depicted for purposes of explanation.

The three design parameters are grid period a=b=4.9 mm, the surface orientation $\phi_{00}$=−135° and the fundamental mode direction $\theta_{00}$=−60°. The designed period and orientation are applied to the 40 GHz component of the unit cell element, which are the highlighted diagonal square rings with smaller size. It should be noted that the geometry shape of the unit cell does not affect the above analysis or results for a rectangular grid structure.

In the evaluation, the fundamental mode direction is synthesized into a 10 cm×10 cm with a surface substrate thickness of 20 mils. The 3D far-field pattern representation and the 2D pattern along the designed plane are shown in FIGS. 5 and 6A, respectively. The plot of FIG. 6A shows the multibeam behavior at the designed angle of −60° from mode 00, −5° from a combination of modes 10 and 01 and 42° (approximately the specified angle of 40°) from mode 11.

The synthesized surface used in the numerical experiment was also fabricated and tested in a more realistic scenario; the measured S21 magnitude is shown in FIG. 6B, where peaks are observed in 40 GHz for the three designed angles. The result at the three designed angles can be referenced to $\theta_{00}$=−30°, where the surface is designed to 28 GHz instead of 40 GHz. An approximately 20 dB difference in magnitude at 40 GHz is seen between the three designed directions and other directions, using $\theta_{00}$=−30° as an example. FIG. 6B shows the transmission magnitude of the split beams at various angles versus varying frequencies of the impinging electromagnetic wave. Note that scattering and diffraction of the objects around the test setup (from not using an anechoic chamber) creates multipath that affect the results; notwithstanding the results shows good correlation when compared to the numerical experiment at the three designed angles.

Example applications of the multibeam metasurface include multibeam satellite communication, e.g., for providing enhanced coverage and capacity for global internet connectivity. In traditional satellite communication systems, a single satellite beam covers a broad geographical area, leading to limitations in terms of data rates and coverage in densely populated regions. Multibeam satellite systems as described herein can overcome these limitations by utilizing an array of smaller beams that can be individually directed to specific regions or user groups. In this scenario, a network of high-capacity user terminals can connect to the satellite's multiple beams, allowing for efficient allocation of resources. Urban areas, remote locations, and even moving vehicles like ships and airplanes can benefit from improved connectivity and higher data rates. The technology described herein thus has significant potential for bridging the digital divide in underserved or remote regions, providing reliable and high-speed internet access to a broader population. Moreover, multibeam satellite communication can also enhance resilience in disaster-stricken areas by enabling rapid deployment of communication services. In such cases, dedicated beams can be directed to the affected region, ensuring efficient communication and coordination during critical times.

As another usage example, a multiple-target radar system based on the multibeam metasurface described herein can serve as a useful application in air traffic control and surveillance. Traditional radar systems may struggle to differentiate between multiple aircraft within close proximity, leading to potential conflicts and inefficient routing. By employing a multibeam metasurface(s) and advanced signal processing techniques, a system can accurately detect and track multiple aircraft simultaneously, even when they are closely spaced.

Beyond air traffic control, multiple-target radar systems are also applicable in military or other surveillance applications, as they enable the detection and tracking of multiple targets such as aircraft, ships, and ground vehicles. In both civil and defense applications, the ability to track multiple targets simultaneously via a multiple-target radar system based on the multibeam metasurface as described herein provides substantial advantages, e.g., more comprehensive monitoring, better decision-making, and improved overall safety and security in complex and/or dynamic environments.

Figure 7:
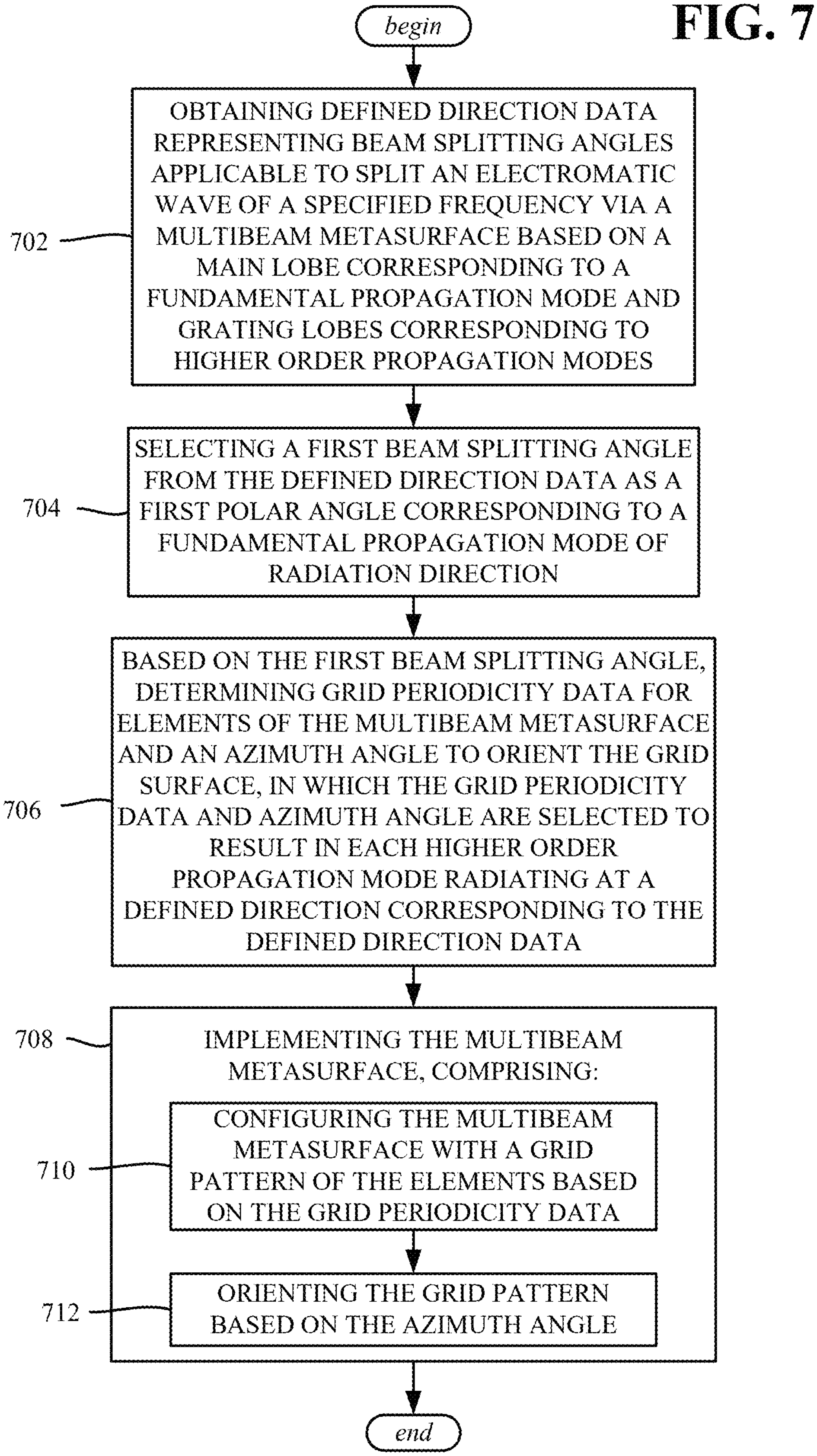
FIG. 7 is a flow diagram showing example operations related to implementing a multibeam metasurface based on determining grid periodicity data and an azimuth angle to orient a grid surface, and, in accordance with various aspects and implementations of the subject disclosure.

One or more aspects can be embodied in a system, such as represented in the example operations of FIG. 7, and for example can include a memory that stores computer executable components and/or operations, and a processor that executes computer executable components and/or operations stored in the memory. Example operations can include operation 702, which represents obtaining defined direction data representing beam splitting angles applicable to split an electromatic wave of a specified frequency via a multibeam metasurface based on a main lobe corresponding to a fundamental propagation mode and grating lobes corresponding to higher order propagation modes. Example operation 704 represents selecting a first beam splitting angle from the defined direction data as a first polar angle corresponding to a fundamental propagation mode of radiation direction. Example operation 706 represents, based on the first beam splitting angle, determining grid periodicity data for elements of the multibeam metasurface and an azimuth angle to orient the grid surface, in which the grid periodicity data and azimuth angle are selected to result in each higher order propagation mode radiating at a defined direction corresponding to the defined direction data. Example operation 708 represents implementing the multibeam metasurface comprising configuring the multibeam metasurface with a grid pattern of the elements based on the grid periodicity data (example operation 710), and orienting the grid pattern based on the azimuth angle (example operation 712).

Selecting the first beam splitting angle can include selecting a beam splitting angle from the defined direction data having a largest incident angle.

The grid periodicity data can include a first value representing a first distance between a first circle and a second circle that is horizontally adjacent to the first circle, the first circle and the second circle representing first adjacent propagation modes, and a second value representing a second distance between a third circle and a fourth circle that is vertically adjacent to the third circle, the third circle and the fourth circle representing second adjacent propagation modes. The first value can equal the second value; (equal values are used in one example, but they are not required to be equal).

Further operations can include redirecting radiation of an electromagnetic wave impinging on the multibeam metasurface to the beam splitting angles.

Determining the grid periodicity data and the azimuth angle can include performing optimization operations to obtain a combination of grid periodicity values and the azimuth angle that maximizes the redirecting of the radiation at the beam splitting angles.

Performing of the optimization operations can include performing the optimization operations subject to a constraint that the grid periodicity data represents a distance greater than a half-wavelength corresponding to the specified frequency.

Performing the optimization operations can include performing the optimization operations subject to a constraint that the grid periodicity data represents a distance that is less than a frequency-specific value to allow only specific higher order propagation modes of the higher order propagation modes to radiate. Implementing the multibeam metasurface can include locating the multibeam metasurface for multibeam satellite communication. Implementing the multibeam metasurface can include locating the multibeam metasurface as part of a multiple-target radar system.

Figure 8:
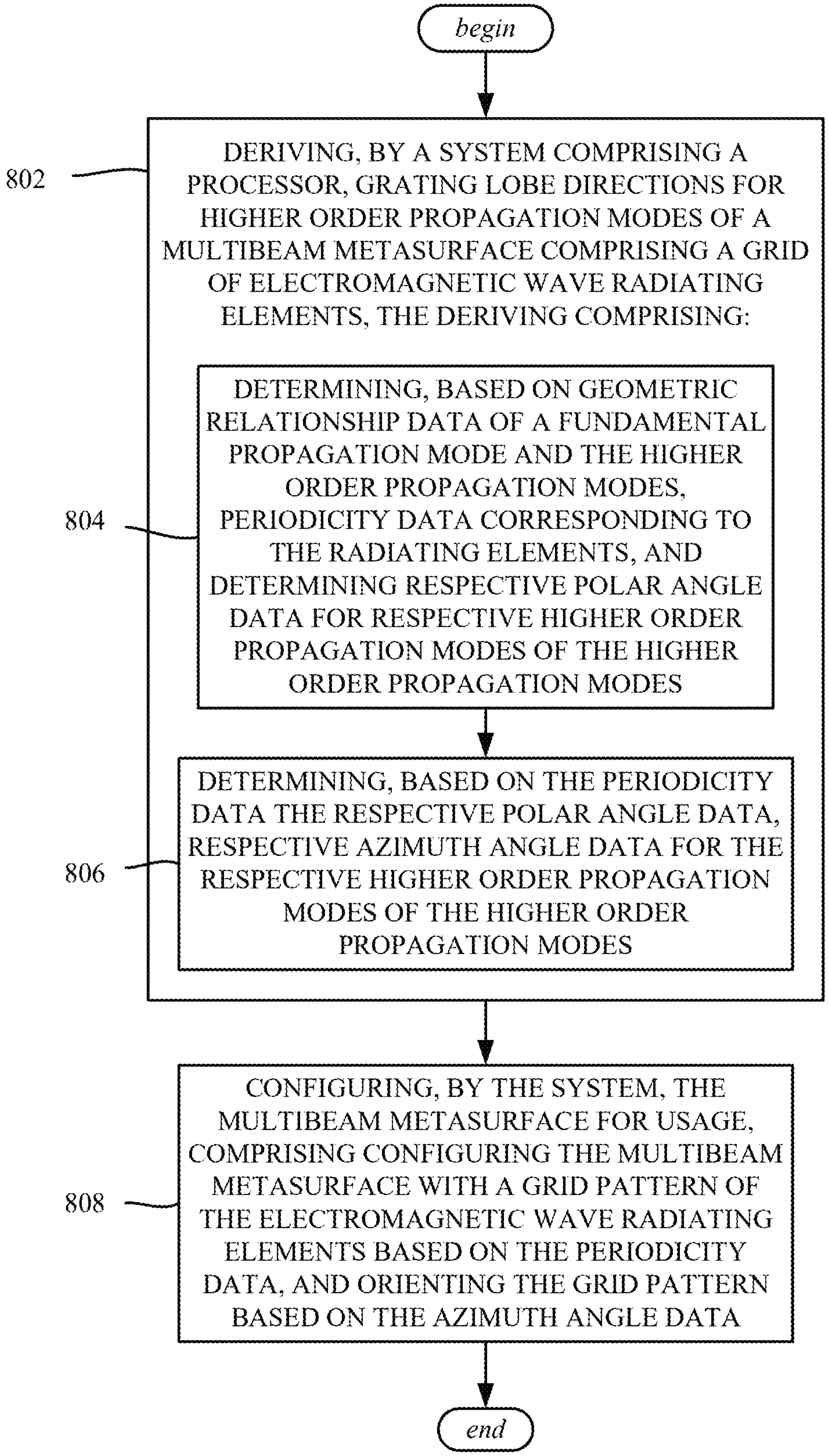
FIG. 8 is a flow diagram showing example operations related to configuring a multibeam metasurface with a grid pattern of electromagnetic wave radiating elements based on periodicity data and orienting a grid pattern based on the azimuth angle data, in accordance with various aspects and implementations of the subject disclosure.

One or more example aspects, such as corresponding to example operations of a method, are represented in FIG. 8. Example operation 802 represents deriving, by a system comprising a processor, grating lobe directions for higher order propagation modes of a multibeam metasurface comprising a grid of electromagnetic wave radiating elements, the deriving comprising example operations 804 and 806. Example operation 804 represents determining, based on geometric relationship data of a fundamental propagation mode and the higher order propagation modes, periodicity data corresponding to the radiating elements, and determining respective polar angle data for respective higher order propagation modes of the higher order propagation modes. Example operation 806 represents determining, based on the periodicity data the respective polar angle data, respective azimuth angle data for the respective higher order propagation modes of the higher order propagation modes. Example operation 808 represents configuring, by the system, the multibeam metasurface for usage, comprising configuring the multibeam metasurface with a grid pattern of the electromagnetic wave radiating elements based on the periodicity data, and orienting the grid pattern based on the azimuth angle data.

Determining, based on the geometric relationship data of the fundamental propagation mode and the higher order propagation modes, can include representing the radiating elements as a circle diagram to obtain grating lobe locations corresponding to the grating lobe directions.

Further operations can include performing, by the system, a Floquet analysis on the circle diagram to obtain the grating lobe locations.

Configuring the multibeam metasurface for usage further can include obtaining defined direction data representing beam splitting angles for splitting an electromatic wave of a specified frequency, performing optimization operations to obtain a combination of selected grid periodicity values and a selected azimuth angle that maximizes the redirecting of the radiation at the beam splitting angles, configuring the multibeam metasurface with the grid pattern based on the based on the selected grid periodicity values, and orienting the grid pattern based on the selected azimuth angle.

Performing the optimization operations can include performing the optimization operations subject to a first constraint that the periodicity data represents a distance greater than a half-wavelength corresponding to the specified frequency, and subject to a second constraint that the periodicity data represents a distance that is less than a frequency-specific value to allow only specific higher order propagation modes of the higher order propagation modes to radiate.

Determining the periodicity data can include determining a first value representing a first distance between a first circle and a second circle that is horizontally adjacent to the first circle, the first circle and the second circle representing first adjacent propagation modes, and determining a second value representing a second distance between a third circle and a fourth circle that is vertically adjacent to the third circle, the third circle and the fourth circle representing second adjacent propagation modes.

Figure 9:
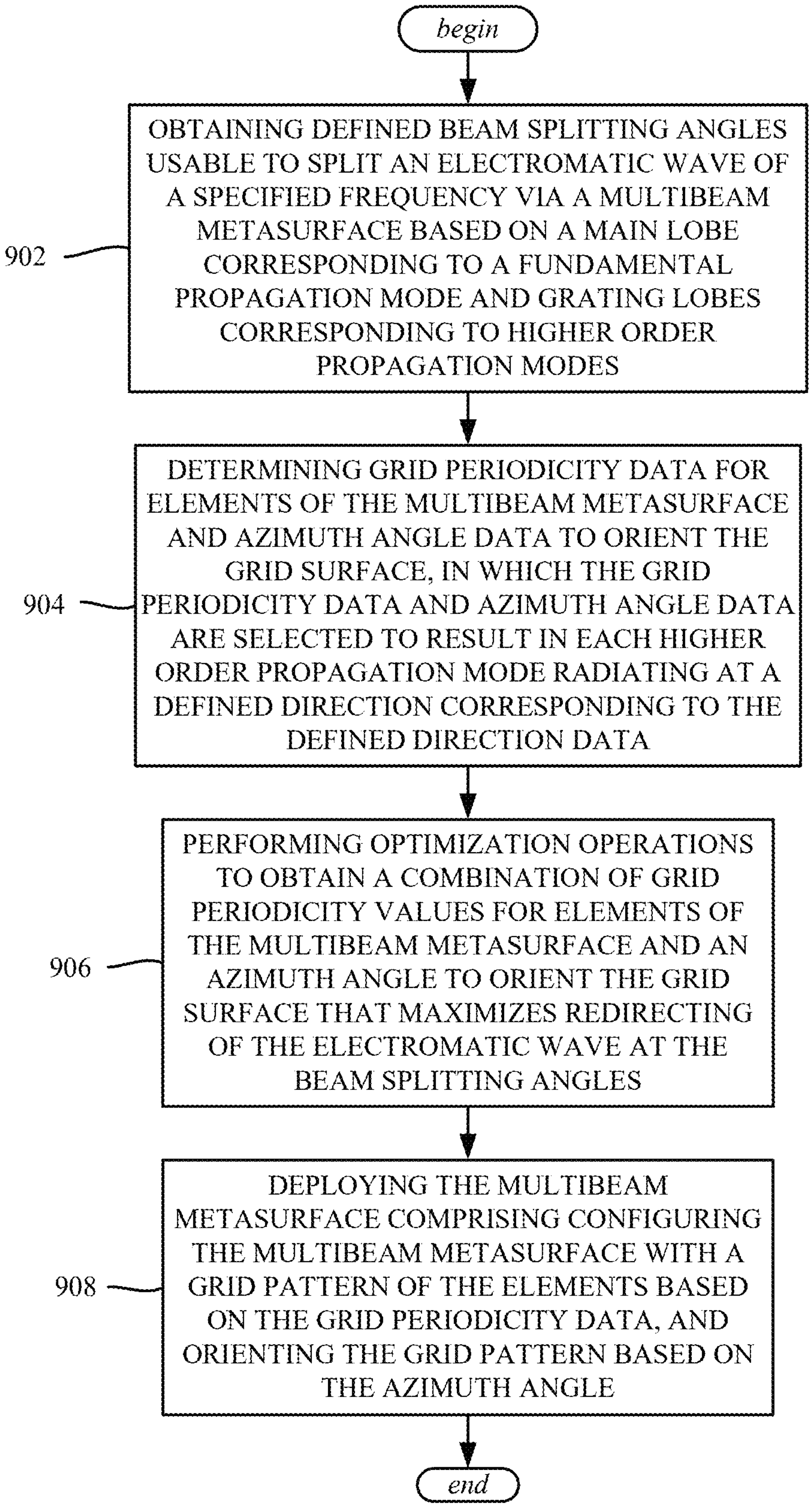
FIG. 9 is a flow diagram showing example operations related to deploying a multibeam metasurface, including configuring the multibeam metasurface with a grid pattern of elements based on determined grid periodicity data, and orienting the grid pattern based on a determined azimuth angle, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents obtaining defined beam splitting angles usable to split an electromatic wave of a specified frequency via a multibeam metasurface based on a main lobe corresponding to a fundamental propagation mode and grating lobes corresponding to higher order propagation modes. Example operation 904 represents determining grid periodicity data for elements of the multibeam metasurface and azimuth angle data to orient the grid surface, in which the grid periodicity data and azimuth angle data are selected to result in each higher order propagation mode radiating at a defined direction corresponding to the defined direction data. Example operation 906 represents performing optimization operations to obtain a combination of grid periodicity values for elements of the multibeam metasurface and an azimuth angle to orient the grid surface that maximizes redirecting of the electromatic wave at the beam splitting angles. Example operation 908 represents deploying the multibeam metasurface comprising configuring the multibeam metasurface with a grid pattern of the elements based on the grid periodicity data, and orienting the grid pattern based on the azimuth angle.

Performing the optimization operations can include performing the optimization operations subject to a first constraint that the grid periodicity data represents a distance greater than a half-wavelength corresponding to the specified frequency, and subject to a second constraint that the grid periodicity data represents a distance that is less than a frequency-specific value to allow only specific higher order propagation modes of the higher order propagation modes to radiate.

Determining the grid periodicity data azimuth angle data can include selecting a beam splitting angle corresponding to a largest incident angle from among the defined beam splitting angles.

Further operations can include determining a location for the multibeam metasurface to redirect radiation of an electromagnetic wave impinging on the multibeam metasurface to the beam splitting angles.

As can be seen, the technology described herein facilitates designing and implementing a multibeam metasurface to split a wave into defined beam directions/angles. A single surface implementation is provided, with numerous advantages over existing beam splitting approaches.

Figure 10:
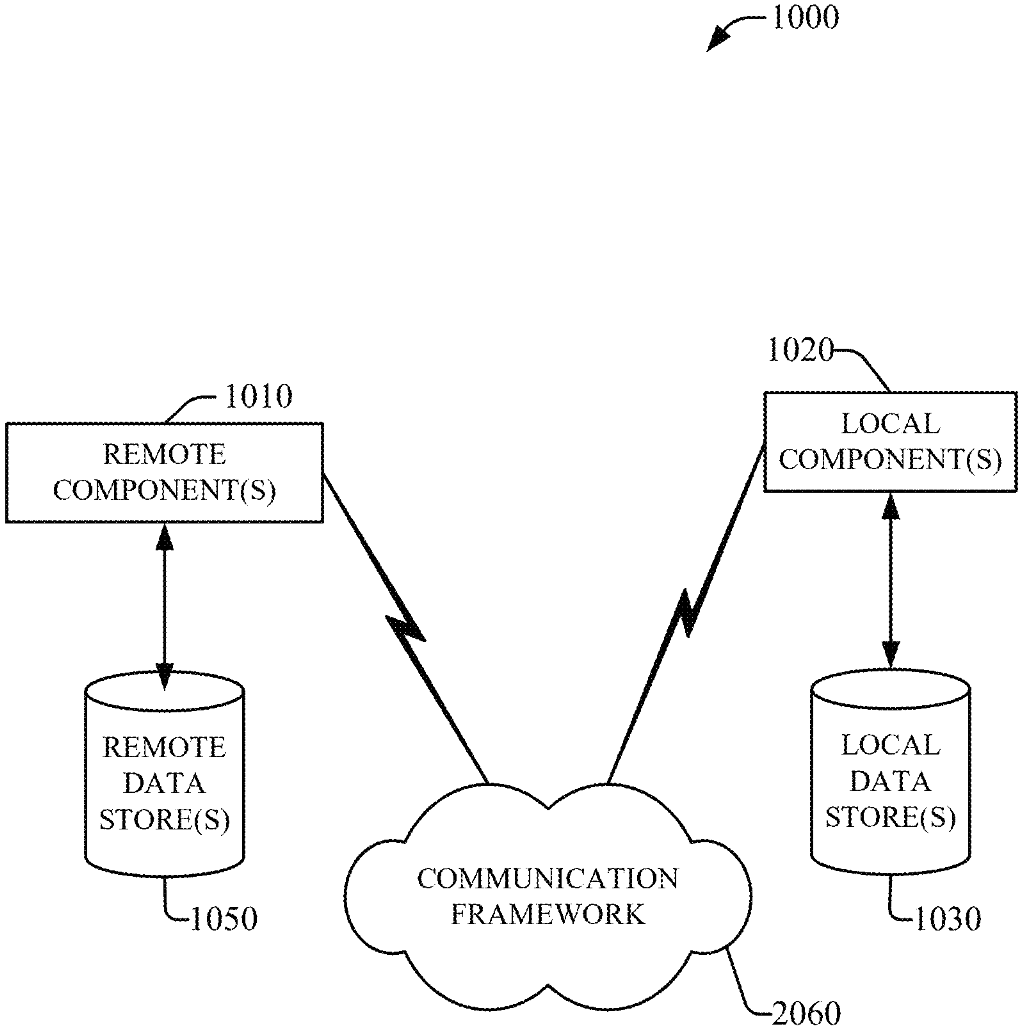
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
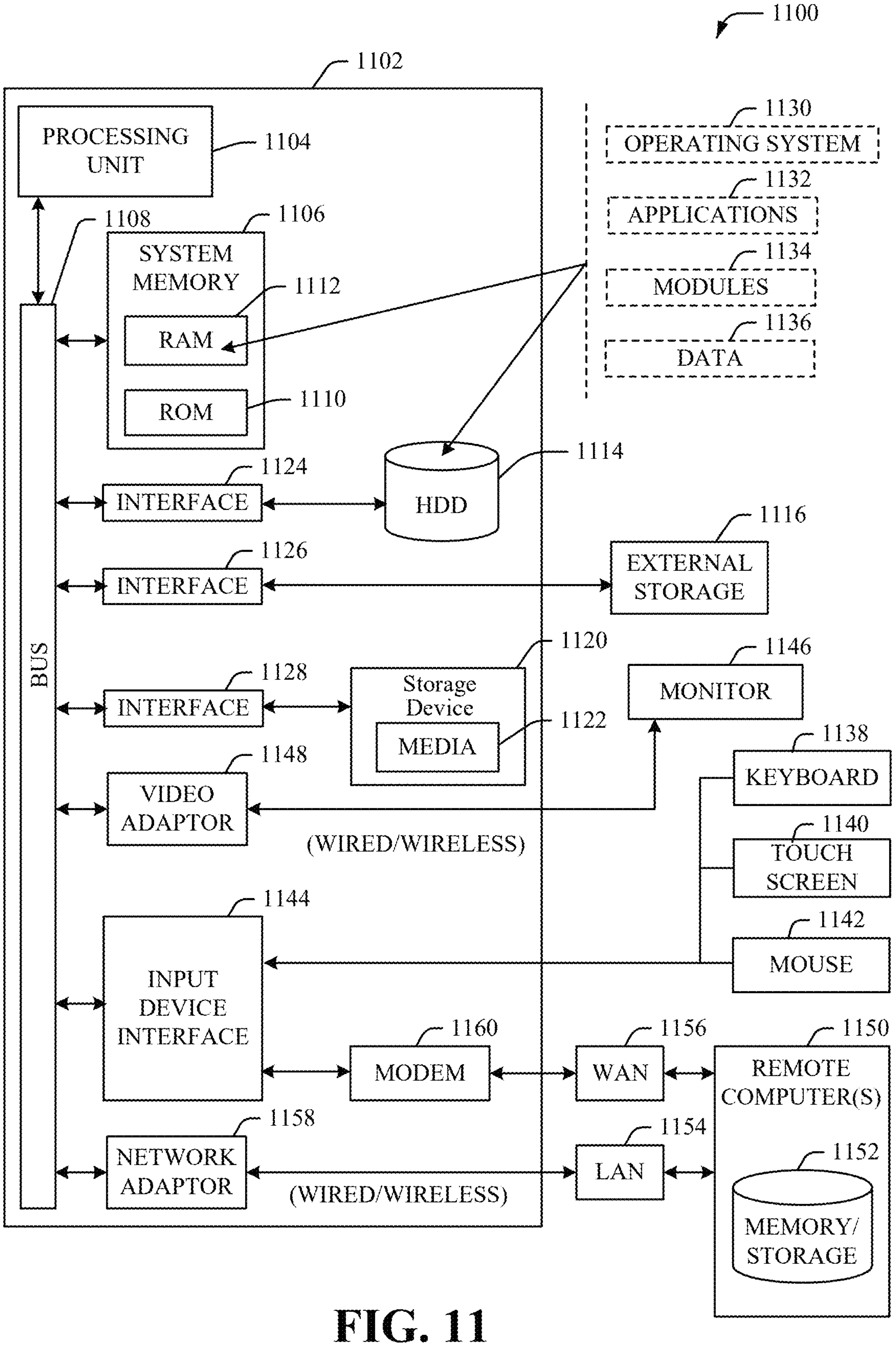
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM

1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (virtual machine) of multiple virtual machines hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
obtaining defined direction data representing beam splitting angles applicable to split an electromagnetic wave of a specified frequency via a multibeam metasurface based on a main lobe corresponding to a fundamental propagation mode and grating lobes corresponding to higher order propagation modes;
selecting a first beam splitting angle from the defined direction data as a first polar angle corresponding to a fundamental propagation mode of radiation direction;
based on the first beam splitting angle, determining grid periodicity data for elements of the multibeam metasurface and an azimuth angle to orient the grid surface, in which the grid periodicity data and azimuth angle are selected to result in each higher order propagation mode radiating at a defined direction corresponding to the defined direction data; and
implementing the multibeam metasurface, comprising:
configuring the multibeam metasurface with a grid pattern of the elements based on the grid periodicity data, and
orienting the grid pattern based on the azimuth angle.

2. The system of claim 1, wherein the selecting of the first beam splitting angle comprises selecting a beam splitting angle from the defined direction data having a largest incident elevation angle.

3. The system of claim 1, wherein the grid periodicity data comprises a first value representing a first distance between a first circle and a second circle that is horizontally adjacent to the first circle, the first circle and the second circle representing first adjacent propagation modes, and a second value representing a second distance between a third circle and a fourth circle that is vertically adjacent to the third circle, the third circle and the fourth circle representing second adjacent propagation modes.

4. The system of claim 3, wherein the first value equals the second value.

5. The system of claim 4, wherein the determining of the grid periodicity data and the azimuth angle comprises performing optimization operations to obtain a combination of grid periodicity values and the azimuth angle that maximizes the redirecting of the radiation at the beam splitting angles.

6. The system of claim 5, wherein the performing of the optimization operations comprises performing the optimization operations subject to a constraint that the grid periodicity data represents a distance greater than a half-wavelength corresponding to the specified frequency.

7. The system of claim 5, wherein the performing of the optimization operations comprises performing the optimization operations subject to a constraint that the grid periodicity data represents a distance that is less than a frequency-specific value to allow only specific higher order propagation modes of the higher order propagation modes to radiate.

8. The system of claim 5, wherein the implementing of the multibeam metasurface comprises locating the multibeam metasurface for multibeam satellite communication.

9. The system of claim 5, wherein the implementing of the multibeam metasurface comprises locating the multibeam metasurface as part of a multiple-target radar system.

10. The system of claim 1, wherein the operations further comprise redirecting radiation of an electromagnetic wave impinging on the multibeam metasurface to the beam splitting angles.

11. A method, comprising:
deriving, by a system comprising a processor, grating lobe directions for higher order propagation modes of a multibeam metasurface comprising a grid of electromagnetic wave radiating elements, the deriving comprising:
determining, based on geometric relationship data of a fundamental propagation mode and the higher order propagation modes, periodicity data corresponding to the radiating elements, and determining respective polar angle data for respective higher order propagation modes of the higher order propagation modes; and
determining, based on the periodicity data the respective polar angle data, respective azimuth angle data for the respective higher order propagation modes of the higher order propagation modes; and
configuring, by the system, the multibeam metasurface for usage, comprising configuring the multibeam metasurface with a grid pattern of the electromagnetic wave radiating elements based on the periodicity data, and orienting the grid pattern based on the azimuth angle data.

12. The method of claim 11, wherein the determining, based on the geometric relationship data of the fundamental propagation mode and the higher order propagation modes, comprises representing the radiating elements as a circle diagram to obtain grating lobe locations corresponding to the grating lobe directions.

13. The method of claim 11, further comprising performing, by the system, a Floquet analysis on the circle diagram to obtain the grating lobe locations.

14. The method of claim 11, wherein the configuring of the multibeam metasurface for usage further comprises obtaining defined direction data representing beam splitting angles for splitting an electromatic wave of a specified frequency, performing optimization operations to obtain a combination of selected grid periodicity values and a selected azimuth angle that maximizes the redirecting of the radiation at the beam splitting angles, configuring the multibeam metasurface with the grid pattern based on the based on the selected grid periodicity values, and orienting the grid pattern based on the selected azimuth angle.

15. The method of claim 14, wherein the performing of the optimization operations comprises performing the optimization operations subject to a first constraint that the periodicity data represents a distance greater than a half-wavelength corresponding to the specified frequency, and subject to a second constraint that the periodicity data represents a distance that is less than a frequency-specific value to allow only specific higher order propagation modes of the higher order propagation modes to radiate.

16. The method of claim 15, wherein the determining of the periodicity data comprises determining a first value representing a first distance between a first circle and a second circle that is horizontally adjacent to the first circle, the first circle and the second circle representing first adjacent propagation modes, and determining a second value representing a second distance between a third circle and a fourth circle that is vertically adjacent to the third circle, the third circle and the fourth circle representing second adjacent propagation modes.

17. A non-transitory machine-readable medium, comprising executable instructions that, when executed by a processor, facilitate performance of operations, the operations comprising:

obtaining defined beam splitting angles usable to split an electromatic wave of a specified frequency via a multibeam metasurface based on a main lobe corresponding to a fundamental propagation mode and grating lobes corresponding to higher order propagation modes;

determining grid periodicity data for elements of the multibeam metasurface and azimuth angle data to orient the grid surface, in which the grid periodicity data and azimuth angle data are selected to result in each higher order propagation mode radiating at a defined direction corresponding to the defined direction data;

performing optimization operations to obtain a combination of grid periodicity values for elements of the multibeam metasurface and an azimuth angle to orient the grid surface that maximizes redirecting of the electromatic wave at the beam splitting angles; and deploying the multibeam metasurface comprising configuring the multibeam metasurface with a grid pattern of the elements based on the grid periodicity data, and orienting the grid pattern based on the azimuth angle.

18. The non-transitory machine-readable medium of claim 17, wherein the performing of the optimization operations comprises performing the optimization operations subject to a first constraint that the grid periodicity data represents a distance greater than a half-wavelength corresponding to the specified frequency, and subject to a second constraint that the grid periodicity data represents a distance that is less than a frequency-specific value to allow only specific higher order propagation modes of the higher order propagation modes to radiate.

19. The non-transitory machine-readable medium of claim 17, wherein the determining of the grid periodicity data azimuth angle data comprises selecting a beam splitting angle corresponding to a largest incident angle from among the defined beam splitting angles.

20. The non-transitory machine-readable medium of claim 17, wherein the operations further comprise determining a location for the multibeam metasurface to redirect radiation of an electromagnetic wave impinging on the multibeam metasurface to the beam splitting angles.

* * * * *